United States Patent [19]

Billstein

[11] Patent Number: 4,697,458

[45] Date of Patent: Oct. 6, 1987

[54] CRANE LOAD-TEST GAUGE

[76] Inventor: Herbert H. Billstein, 5978 SW. Shallowbrook La., Beaverton, Oreg. 97007

[21] Appl. No.: 933,750

[22] Filed: Nov. 21, 1986

[51] Int. Cl.$^4$ .................. G01L 3/00; G01M 19/00
[52] U.S. Cl. ........................ 73/862; 73/865.9; 114/125
[58] Field of Search ............ 3/1 R, 1 B, 4 D, 862.56, 3/865.9, 862; 114/125

[56] References Cited

U.S. PATENT DOCUMENTS

| | | |
|---|---|---|
| 210,864 | 12/1878 | Laubscher . |
| 3,083,673 | 4/1963 | Ripley . |
| 3,270,702 | 9/1966 | Field . |
| 4,207,828 | 6/1980 | Horowitz et al. . |
| 4,223,554 | 9/1980 | Ulbing ................. 73/862 |
| 4,529,064 | 7/1985 | D'Andrea, Jr. . |

FOREIGN PATENT DOCUMENTS 175282  9/1965  U.S.S.R. ................. 73/862

*Primary Examiner*—Charles A. Ruehl
*Attorney, Agent, or Firm*—Kolisch, Hartwell & Dickinson

[57] ABSTRACT

The crane load-test gauge of the instant invention includes an elongate vessel having multiple fluid containing compartments therein. Each compartment has an open top side. A fluid carrying manifold is disposed along the length of the vessel and has a valve mechanism associated with each of the compartments for introducing fluid into the compartment. The manifold has a conventional fire hose connector on the free end thereof. A level adjusting mechanism is provided for adjusting the level of fluid in a compartment. The level adjusting mechanism includes a trim valve for partially emptying a single compartment and a sluice valve for transferring fluid between compartments. A sight gauge is affixed to a side of each compartment in communication with the interior thereof. The sight gauge is operable to indicate a fluid level in its associated compartment. A weight indicator includes calibrated markings adjacent each of the sight gauges to provide, with the fluid level at a predetermined point, the weight of the compartment and the fluid contained therein. An overflow mechanism is provided to prevent filling of the vessel beyond a predetermined level. A drain is provided for emptying completely the fluid contained in the vessel. The gauge includes a lifting mechanism for attaching the gauge to a crane to be tested.

20 Claims, 4 Drawing Figures

CRANE LOAD-TEST GAUGE

BACKGROUND AND SUMMARY OF THE INVENTION

The instant invention relates to crane testing equipment and specifically to a crane load-test gauge which may be used as a proof load-test for certifying the lifting ability of a crane.

Heavy lift cranes must be certified as being capable of lifting an object having a weight up to a particular known maximum. The most frequent technique for conducting such testing involves lifting by a crane of a number of large concrete blocks of a known weight.

There are several disadvantages encountered in the proof testing of cranes through the use of concrete blocks. First, the blocks must be transported between crane locations. Cranes requiring certification are generally capable of lifting in excess of 100,000 pounds. Testing using concrete blocks requires either the shipment of an inordinate amount of weight, or the rigging of a crane such that a lighter weight will simulate a heavier weight under actual operating conditions. Second, although a block may have a known weight, repeated use frequently results in portions of the block being broken away, resulting in an actual weight less than that of the originally constructed block. Finally, if the crane being proof tested is equipped with twist-lock lift fittings, as are found on shipping containers, the crane must be rerigged with a lifting hook and bridle arrangement to accommodate the large concrete blocks.

An object of the instant invention is to provide a crane load-test gauge which is suitable for efficiently proof testing heavy lift cranes.

Another object of the instant invention is to provide a crane load-test gauge which is suitable for testing cranes equipped with both twist-lock and hook connections.

A further object of the instant invention is to provide a crane load-test gauge which is easily transportable in a relatively lightweight condition.

Another object of the instant invention is to provide a crane load-test gauge which is operable to simulate various sized containers.

Still another object of the instant invention is to provide a crane load-test gauge which has an adjustable gross weight.

The crane load-test gauge of the instant invention includes an elongate vessel having multiple fluid containing compartments therein. Each compartment has an open top side. A fluid carrying manifold is disposed along the length of the vessel and has a valve mechanism associated with each of the compartments for introducing fluid into the compartment. The manifold has a conventional fire hose connector on the free end thereof. A level adjusting mechanism is provided for adjusting the level of fluid in a compartment. The level adjusting mechanism includes a trim valve for partially emptying a single compartment and a sluice valve for transferring fluid between compartments. A sight gauge is affixed to a side of each compartment in communication with the interior thereof. The sight gauge is operable to indicate a fluid level in its associated compartment. A weight indicator includes calibrated markings adjacent each of the sight gauges to provide, with the fluid level at a predetermined point, the weight of the compartment and the fluid contained therein. An overflow mechanism is provided to prevent filling of the vessel beyond a predetermined level. A drain is provided for emptying completely the fluid contained in the vessel. The gauge includes a lifting mechanism for attaching the gauge to a crane to be proof tested.

These and other objects and advantages of the instant invention will become more fully apparent as the description which follows is read in conjunction with the drawings.

DETAILED DESCRIPTION OF THE PREFERRED EMBODIMENT

Figure 1:
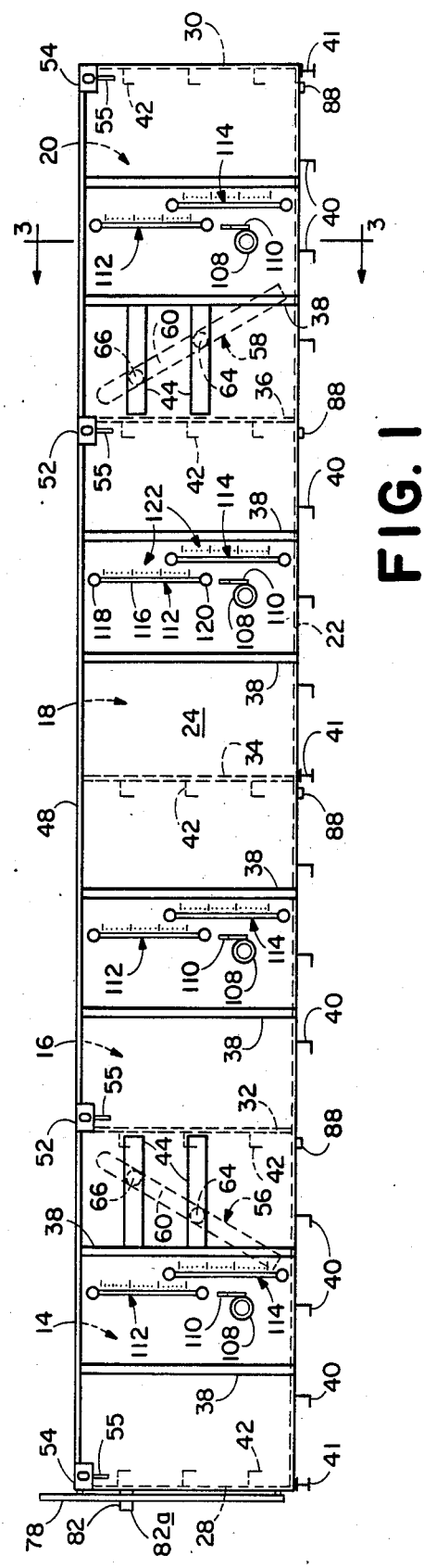
FIG. 1 is a side elevation of a crane load-test gauge constructed according to the instant invention.
Figure 2:
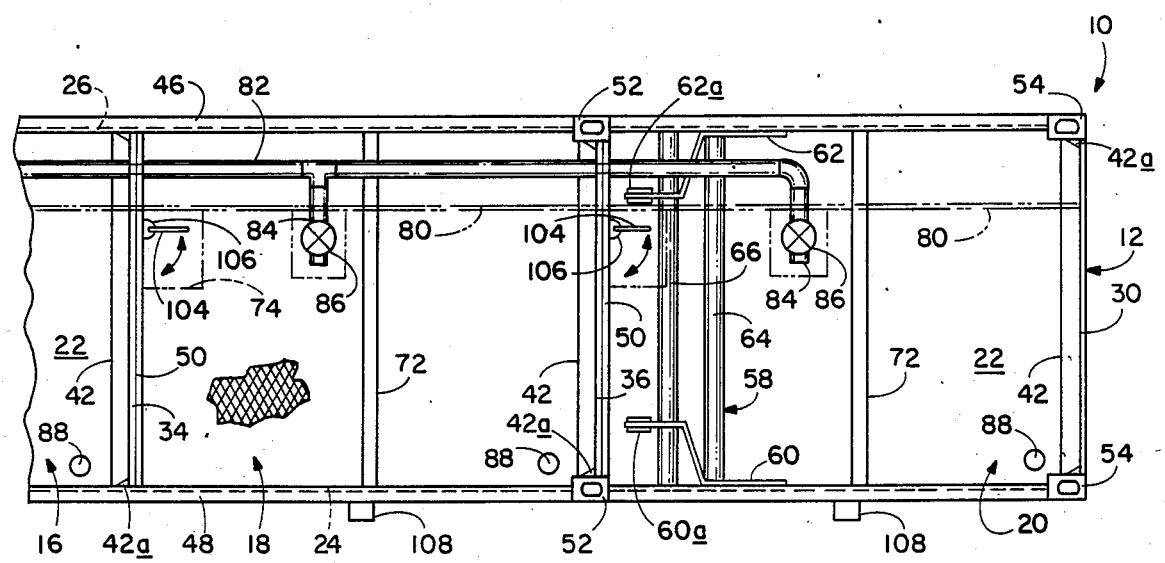
FIG. 2 is an enlarged, partial top plan view of the test gauge, taken generally along the line 2—2 of FIG. 1, with portions broken way to show detail.

Turning now to the drawings, and initially to FIGS. 1 and 2, a crane load-test gauge (CTG) constructed according to the invention is shown generally at 10. Test gauge 10 includes an elongate vessel 12. Vessel 12, in the preferred embodiment, includes multiple fluid containing compartments, such as those shown at 14, 16, 18 and 20. Each compartment is watertight and is suitable for containing a large quantity of fluid, which will generally be fresh water. In a preferred embodiment, the vessel is constructed to be 40 feet long, 7 feet 3½ inches wide, and approximately 6 feet high, which are the dimensions of a standard 40 foot shipping container (some 40 foot containers may be higher than 6 feet). The CTG is operable to provide a test weight from approximately 7.5 short tons up to 62.5 short tons in 100 pound increments.

In the preferred embodiment, the vessel is constructed of steel plate conforming to ASTM A36. Such material is used to form the bottom 22, sides 24, 26, ends 28, 30, and bulkheads 32, 34 and 36. The sides and ends are formed, in the preferred embodiment, of ¼" stock while the bottom and bulkheads are formed of 3/16" stock.

The plating material is reinforced by stiffeners, such as side stiffeners 38, bottom stiffeners 40, bottom supports 41 (I-beams) and bulkhead/end stiffeners 42 which are welded to the plating material to provide rigidity. Bulkhead/end stiffeners 42 are provided with a snipe 42a at the juncture of a bulkhead or end with the side plates in order to provide complete drainage of fluid received in the container. Additionally, horizontal side stiffeners 44 are attached to sides 24, 26 to provide additional support for a lifting strap, to be described later herein.

In the preferred embodiment, side stiffeners 38, 44 and bottom stiffeners 40 are constructed from 4"×3"×¼" angle iron. Bulkhead/end stiffeners 42 are formed of 3"×¼" angle iron. Bottom supports 41 are 6" I-beam stock.

A pair of longitudinal stiffeners 46, 48 extend along the top margin of longitudinal or long sides 24, 26, respectively, and are welded to sides 24 and 26 as well as the upper ends of side stiffeners 38. In the preferred embodiment, longitudinal stiffeners 46, 48 are formed of 5"×3/4" plate.

A cover/walkway support 50 is secured at the top margins of bulkheads to provide a support for the covers and walkway, to be described later herein.

Vessel 12 is constructed and arranged to simulate shipping containers as might be lifted by cranes involved in the Maritime industry. To this end, vessel 12 is provided with lifting means for attaching the vessel to a crane to be tested. Two types of lifting means are provided in the preferred embodiment. The first type of lifting means includes twist-lock fittings 52, 54. Twist-lock fittings 52, 54 are of the standard type and are positioned, in the case of fittings 52, to precisely engage a crane spreader frame constructed to lift 20 foot containers and, in the case of fittings 54, to engage spreader frames constructed to lift 40 foot containers. Gussets 55 are provided to strengthen the connection of twist-lock fittings 52, 54 to vessel 12.

Figure 3:
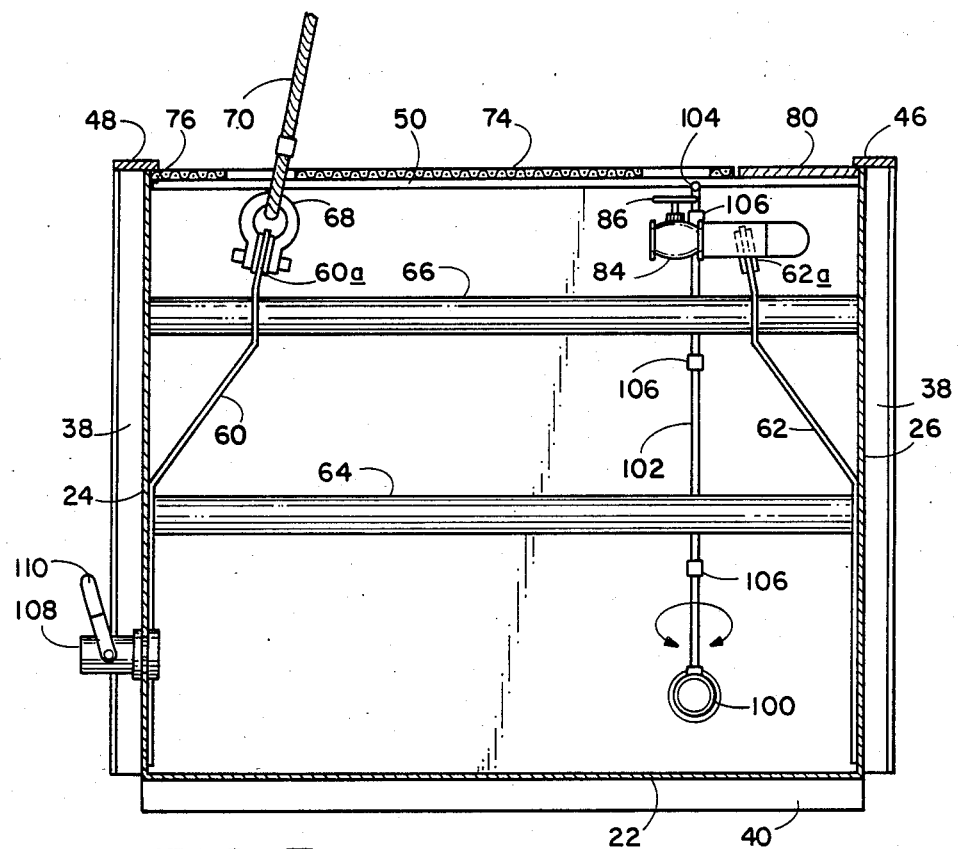
FIG. 3 is a further enlarged cross-sectional view of the test gauge, taken generally along the line 3—3 of FIG. 1.

Lifting means also includes a set of lifting straps, shown generally at 56, 58. Referring now to FIGS. 1, 2 and 3, the lifting straps will be described in greater detail. Each strap, such as straps 60, 62 are secured to the sides of vessel 12 along a substantial portion of their length. The straps are then constructed to bend medially into the vessel and terminate in a reinforced eye 60a, 62a, respectively. Pipe struts 64, 66 extend transversely across the width of the vessel, passing through straps 60, 62. The struts are secured to the inside of sides 24, 26 adjacent horizontal side stiffeners 44. If the vessel is to be lifted by the lifting straps, a shackle, such as shackle 68 may be inserted through the lifting strap eyes. Suitable cables, such as cable 70 may be attached to the clevis thereby to form a bridle to which a crane hook may be attached for lifting. Similar elements are used in the construction of lifting strap arrangement 56.

Referring now to FIG. 2, transverse supports 72 are provided intermediate the bulkheads for supporting safety covers and a walkway. A safety cover is provided to cover the open top side of each compartment. Safety covers, such as cover 74, are formed of woven mesh or expanded metal material supported on a 3/4"×1/8" angle iron frame. Referring now to FIG. 3, hinges 76 are provided along one longitudinal edge of vessel 12 to secure the safety covers to the vessel. The safety covers are provided to prevent the falling of objects into the compartments, particularly workers who may be positioned atop the vessel. The safety covers are provided with cut outs suitable to allow operations of the gauge control valves.

In order to provide safe access to the top of the vessel, a ladder 78 is provided at at least one end of the vessel. A walkway 80 extends along the length of the vessel on the edge opposite where the safety covers are hinged. In the preferred embodiment, four panels of expanded metal grating make up the walkway. The end panels have suitable holes formed therein to allow connection of a bridle to the lifting straps.

A fluid carrying manifold 82 is disposed along the length of the vessel. The manifold has a valve 84 having a valve handle 86 which is used to open the valve thereby to allow the introduction of fluid into the compartment. A separate valve is provided for each compartment. The free end 82a of manifold 82 has a conventional fire hose connection to allow connection of manifold 82 to a fresh water supply. One or more valves may be opened simultaneously to allow filling of one or more compartments.

Drain means are provided in each compartment for emptying completely the fluid contained in the vessel. In the preferred embodiment, drain means take the form of a plug 88 located in bottom plate 22 in each compartment. Plug 88 is received in a suitable tank flange which is secured to bottom plate 22. The plug is removed to completely form the underside of the vessel to drain the tank.

Figure 4:
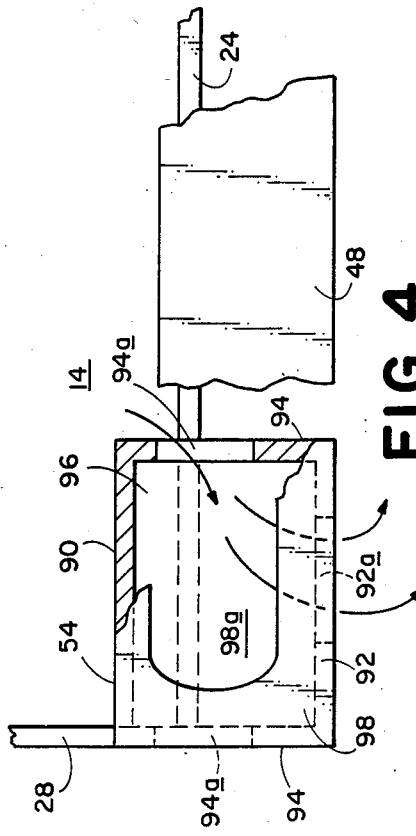
FIG. 4 is a greatly enlarged top plan view of the twist lock fitting of the invention, taken generally along the line 4—4 of FIG. 2.

Overflow means are provided to prevent filling of the vessel above a predetermined level. Although the predetermined level is closely adjacent the top margin of the sides and ends, it is nevertheless set so that the fluid level will remain below the upper margin and below the level of the safety covers and walkway. Referring now to FIG. 4, twist-lock fitting 54 is shown in greater detail. The fitting includes a rear side wall 90, a front side wall 92 and end side walls 94. The fitting also includes a base 96 and a top cover 98. It is to be noted that top cover 98, end side walls 94 and front side wall 92 are formed with open areas 98a, 94a, and 92a, respectively. It may be seen that open area 94a communicates with both the interior and exterior of compartment 14, thereby allowing the flow of fluid through area 94a, into the interior of fitting 54 and then out through the other open areas in the fitting. This provides that the fluid level in the compartments will never exceed the lower edge of an open area, such as 94a.

Level adjusting means are provided for adjusting the level of fluid in an individual compartment. The first component of the level adjusting means provides for intracompartmental adjustment which allows the transfer of fluid between compartments. In the preferred embodiment, the intracompartmental adjustment mechanism takes the form of a sluice valve 100 (FIG. 3) which is located near the bottom of each bulkhead. An extension rod 102 extends upwardly from the valve to a valve control handle 104. The rod is supported on the bulkhead by rod-support elements 106. The valves may be opened to allow fluid to flow between adjacent compartments. During a filling operation, the opening of all manifold valves 84 and all sluice valves 100 would promote the even filling of the individual compartments in the vessel.

The level adjusting means also includes a trim adjusting mechanism, which in the preferred embodiment, takes the form of trim valves 108 having a valve handles 110. Trim valves are operable to empty a single compartment should it be necessary to adjust the weight of fluid in an individual compartment.

Fluid level indicating means are provided to indicate a fluid level inside of the vessel. In the preferred embodiment, fluid level means takes the form of sight gauges which are affixed to a side of each compartment and are in communication with the interior thereof. Referring now to FIG.. 1, an upper sight gauge 112 and a lower sight gauge 114 are provided for each compartment. Each sight gauge includes a sight glass 116, an upper valve 118 and a lower valve 120. Valves 118, 120 are provided so that fluid may be maintained in a compartment in the event that a sight glass is damaged or broken. Two gauges are provided for each compartment, in the preferred embodiment, to enable the use of a sight glass which is of considerably less length than the height of the vessel.

Weight indicator means are provided and are operable with the sight gauges to indicate the weight of a given portion of the gauge, such as an individual compartment. The weight indicators in the preferred embodiment includes calibrated markings 122 adjacent each of the sight gauges. The calibrations take into account the weight of the vessel and, with the fluid level at any given point in the compartment, indicate the weight of the compartment with the fluid contained therein. The sum of compartmental weights is equal to the gross weight of the gauge.

As previously noted, the CTG is operable to provide a test weight from approximately 7.5 short tons up to 62.5 short tons in 100 pound increments. The completed vessel has a weight of approximately 15,000 pounds. Given the standard dimensions of a shipping container, the vessel is capable of holding a total of 1,823 cubic feet of water. Fresh water of that volume, at standard temperature would weigh 113,810 pounds. Thus the combined weight of the vessel and a full load of fresh water, at standard temperature, would be 128,810 pounds. If the CTG is to be lifted by a crane hook, the weight of the bridle must also be considered. A suitable bridle would weigh approximately 900 pounds.

In operation, the empty CTG is transported by truck or rail to a crane testing sight. The CTG is checked to ensure that drain plugs are secured and that trim valves 108 are in their closed positions. A standard fire hose is connected to manifold 82 and valves 84 opened into as many compartments as the test requires to be filled. Referring now to FIG. 3, the relationship between cover 74 and valve handle 86 is such that valve handle 86 will be flush with the top of or below cover 74 when it is in its full open position. This construction serves to eliminate the protrusion of any objects above the surface of cover 74 which might cause an individual working on the top of the CTG to trip, and also provides that the valve handle is protected from damage by objects which may land on top of cover 74. It should be noted that for testing a crane which is limited to lifting 20 foot long containers, the center two compartments 16, 18 would be the only compartments filled. Sluice valves 100 may be opened to facilitate equalization of water levels between adjacent compartments. The device may also be constructed such that suitable plumbing is provided to allow equalization of water levels in nonadjacent compartments. The appropriate valves on the sight gauges are opened to allow monitoring of the water level in the compartments.

Assuming that the CTG is not to be loaded to its maximum weight and that, for some reason, one or more compartments is overfilled, a single compartment may be partially drained by opening trim valve 108 until the appropriate fluid level is achieved inside the compartment. Once the desired fluid level is reached, valves 84 may be shut off and the hose disconnected from manifold 82. The CTG is then ready to be used in crane load testing in order to certify the crane. Once the testing is complete, the vessel may be drained of fluid. This is easily accomplished by opening trim valves 108 and removing plugs 88. Once the CTG has been thoroughly drained, it may be placed on a suitable truck or other carriage device for transport to the new location of the next test.

Although a preferred embodiment of the invention has been described herein, it should be appreciated that variations and modifications may be made thereto without departing from the spirit of the invention.

It is claimed and desired to secure by Letters Patent:

1. A crane load-test gauge for proof testing the lifting capacity of a crane comprising:
   an elongate vessel having multiple fluid containing compartments therein, said compartments each having an open top side;
   a fluid carrying manifold disposed along the length of said vessel having valve means associated with each of said compartments for introducing fluid into said compartments;
   level adjusting means for adjusting the level of fluid in a compartment;
   fluid level indicator means operable to indicate a fluid level in said vessel;
   weight indicator means operable with said fluid level means to indicate the weight of the vessel; and
   drain means for emptying completely the fluid contained in said vessel.

2. The gauge of claim 1 wherein said fluid level indicator means includes a sight gauge affixed to a side of each compartment in communication with the interior thereof.

3. The gauge of claim 2 wherein said weight indicator means includes calibrated markings adjacent each of said sight gauges to provide, with the fluid level at a predetermined point, the weight of the compartment and the fluid contained therein.

4. The gauge of claim 1 wherein said level adjusting means includes an intra-compartmental adjusting mechanism for transferring fluid between compartments and a trim adjusting mechanism for partially emptying a single compartment.

5. The gauge of claim 4 wherein said intracompartmental mechanism includes a sluice valve for transferring fluid between adjacent compartments.

6. The gauge of claim 1 which further includes safety covers to prevent the falling of objects into said compartments and which further includes a walkway extending along the length of said vessel along the top thereof to allow access to the top side thereof.

7. The gauge of claim 1 which further includes overflow means to prevent filling of said vessel above a predetermined level.

8. The gauge of claim 1 which further includes lifting means for attaching the gauge to a crane to be tested.

9. A crane load-test gauge for proof testing the lifting capacity of a crane comprising:
   an elongate vessel having multiple fluid containing compartments therein, said compartments each having an open top side;
   a fluid carrying manifold disposed along the length of said vessel having valve means associated with each of said compartments for introducing fluid into said compartments;
   level adjusting means for adjusting the level of fluid in a compartment;
   a sight gauge affixed to a side of each compartment in communication with the interior thereof operable to indicate a fluid level in said vessel;
   weight indicator means operable with said sight gauges to indicate the weight of the vessel including calibrated markings adjacent each of said sight gauges to provide, with the fluid level at a predetermined point, the weight of the compartment and the fluid contained therein;
   drain means for emptying completely the fluid contained in said vessel; and
   lifting means for attaching the gauge to a crane to be tested.

10. The gauge of claim 9 wherein said level adjusting means includes a trim valve for partially emptying a single compartment.

11. The gauge of claim 9 wherein said level adjusting means includes a sluice valve for transferring fluid between adjacent compartments.

12. The gauge of claim 9 which further includes openable safety covers to prevent the falling of objects into said compartments.

13. The gauge of claim 12 wherein said safety covers are hinged along one long edge of said vessel and which further includes a walkway extending along the length of said vessel along the other long edge thereof to allow safe access to the top side thereof.

14. The gauge of claim 9 wherein said lifting means includes twist-lock fittings constructed and arranged along the long edges of said vessel for engagement by container-lifting cranes.

15. The gauge of claim 9 wherein said lifting means includes lifting straps fixed to said vessel for engagement by a bridle-and-hook equipped lifting crane.

16. A crane load-test gauge for proof testing the lifting capacity of a crane comprising:
- an elongate vessel having multiple fluid containing compartments therein, said compartments each having an open top side;
- a fluid carrying manifold disposed along the length of said vessel having valve means associated with each of said compartments for introducing fluid into said compartments;
- level adjusting means for adjusting the level of fluid in a compartment, including a trim valve for partially emptying a single compartment, and a sluice valve for transferring fluid between adjacent compartments;
- a sight gauge affixed to a side of each compartment in communication with the interior thereof operable to indicate a fluid level in its associated compartment;
- weight indicator means operable with said fluid level means to indicate the weight of the gauge including calibrated markings adjacent each of said sight gauges to provide, with the fluid level at a predetermined point, the weight of the compartment and the fluid contained therein;
- overflow means to prevent filling of said vessel beyond a predetermined level;
- drain means for emptying completely the fluid contained in said vessel; and
- lifting means for attaching the gauge to a crane to be tested.

17. The gauge of claim 16 wherein said lifting means includes twist-lock fittings constructed and arranged along the long edges of said vessel for engagement by container-lifting cranes.

18. The gauge of claim 17 wherein said overflow means is integrally formed with said twist-lock fittings.

19. The gauge of claim 16 wherein said lifting means includes lifting straps fixed to said vessel for engagement by a bridle-and-hook equipped lifting crane.

20. The gauge of claim 16 which further includes openable safety covers to prevent the falling of objects into said compartments, said safety covers being hinged along one long edge of said vessel and which further includes a walkway extending along the length of said vessel along the other long edge thereof to allow safe access to the top side thereof.

* * * * *